United States Patent
Zarifi et al.

(10) Patent No.: US 11,864,146 B2
(45) Date of Patent: Jan. 2, 2024

(54) SOLUTIONS TO TIMING REFERENCE FOR DETECTION AND REPORT OF UL RSAT ASYNCH NODES OR NODES WITHOUT A TIME FRAME STRUCTURE

(71) Applicant: Huawei Technologies Co., Ltd., Shenzhen (CN)

(72) Inventors: Keyvan Zarifi, Ottawa (CA); Su Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 17/224,680

(22) Filed: Apr. 7, 2021

(65) Prior Publication Data

US 2021/0227484 A1 Jul. 22, 2021

Related U.S. Application Data

(63) Continuation of application No. PCT/CN2019/080104, filed on Mar. 28, 2019.

(51) Int. Cl.
  *H04W 56/00* (2009.01)
  *H04W 72/0446* (2023.01)
  *H04W 72/21* (2023.01)

(52) U.S. Cl.
  CPC ....... *H04W 56/008* (2013.01); *H04W 56/005* (2013.01); *H04W 72/0446* (2013.01); *H04W 72/21* (2023.01)

(58) Field of Classification Search
  CPC ............. H04W 56/008; H04W 56/005; H04W 72/0446; H04W 72/21
  See application file for complete search history.

(56) References Cited

U.S. PATENT DOCUMENTS

| 8,331,955 B2 | 12/2012 | Bull et al. |
| 2011/0170444 A1 | 7/2011 | Alles et al. |
| (Continued) | | |

FOREIGN PATENT DOCUMENTS

| CN | 1867196 A | 11/2006 |
| CN | 101622891 A | 1/2010 |
| (Continued) | | |

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP TS 36.305 V15.2.0, Technical Specification, Dec. 2018, 4 Pages.

(Continued)

*Primary Examiner* — Brenda H Pham
(74) *Attorney, Agent, or Firm* — Slater Matsil, LLP

(57) ABSTRACT

A method determining a timing of an uplink signal includes receiving timing information associated with an uplink signal and a numerology of the uplink signal, wherein the timing information is used to determine a reference time of the uplink signal received from a user equipment (UE), receiving, from the UE, the uplink signal, wherein the receiving is in accordance with the timing information and the numerology of the uplink signal, and measuring an uplink relative time of arrival in accordance with the received uplink signal and the reference time of the uplink signal.

28 Claims, 9 Drawing Sheets

(56) References Cited

U.S. PATENT DOCUMENTS

| | | | |
|---|---|---|---|
| 2012/0020320 A1 | 1/2012 | Issakov et al. | |
| 2012/0129550 A1 | 5/2012 | Hannan et al. | |
| 2013/0135148 A1 | 5/2013 | Fix et al. | |
| 2013/0303199 A1* | 11/2013 | Siomina | H04W 24/10 455/456.5 |
| 2014/0092771 A1* | 4/2014 | Siomina | H04W 24/08 370/252 |
| 2014/0120947 A1* | 5/2014 | Siomina | G01S 5/02213 455/456.1 |
| 2014/0148733 A1 | 5/2014 | Stone et al. | |
| 2014/0323152 A1 | 10/2014 | Zhang et al. | |
| 2015/0189610 A1 | 7/2015 | Siomina et al. | |
| 2015/0334707 A1 | 11/2015 | Rajagopalan et al. | |
| 2017/0238298 A1 | 8/2017 | Wang et al. | |
| 2017/0288897 A1 | 10/2017 | You et al. | |
| 2017/0325250 A1 | 11/2017 | Manolakos et al. | |
| 2017/0366313 A1 | 12/2017 | Rahman et al. | |
| 2018/0270784 A1 | 9/2018 | Lee et al. | |

FOREIGN PATENT DOCUMENTS

| | | |
|---|---|---|
| CN | 101953093 A | 1/2011 |
| CN | 102027791 A | 4/2011 |
| CN | 102573060 A | 7/2012 |
| CN | 102624466 A | 8/2012 |
| CN | 103548400 A | 1/2014 |
| CN | 104412676 A | 3/2015 |
| CN | 104620516 A | 5/2015 |
| CN | 105408765 A | 3/2016 |
| CN | 105519211 A | 4/2016 |
| CN | 108605304 A | 9/2018 |
| CN | 109075827 A | 12/2018 |
| EP | 2695317 B1 | 11/2018 |
| WO | 2013035974 A1 | 3/2013 |

OTHER PUBLICATIONS

"3rd Generation Partnership Project; Technical Specification Group Radio Access Network; Evolved Universal Terrestrial Radio Access Network (E-UTRAN); SLm Application Protocol SLmAP) (Release 11)", 3GPP TS 36.459 V1.0.2, Nov. 2012, Technical Specification, 5 Pages.

CATT, "NR RAT-dependent UL Positioning", 3GPP TSG RAN WG1 Ad-Hoc Meeting 1901, R-1900311, Jan. 21-25, 2019, 13 Pages, Taipei.

Ericsson, "RAT dependent NR positioning solutions", 3GPP TSG-RAN WG1 #95, R1-1813592, Nov. 12-16, 2018, 15 Pages, Spokane, United States.

Huawei, et al., "Remaining issues on UL-based positioning", 3GPP TSG RAN WG1 Meeting #96, R1-1901575, Feb. 25-Mar. 1, 2019, 15 Pages, Athens, Greece.

\* cited by examiner

SOLUTIONS TO TIMING REFERENCE FOR DETECTION AND REPORT OF UL RSAT ASYNCH NODES OR NODES WITHOUT A TIME FRAME STRUCTURE

CROSS-REFERENCE TO RELATED APPLICATIONS

This application is a continuation of International Application No. PCT/CN2019/080104, filed on Mar. 28, 2019, the disclosure of which is hereby incorporated by reference in its entirety.

TECHNICAL FIELD

The present disclosure relates generally to a system and method for digital communications, and, in particular embodiments, to a system and method for signal detection at asynchronous devices and devices without a time frame structure.

BACKGROUND

Location-based services have become important in modern communications systems. Knowledge of the location (also commonly referred to as position) of a communications device, such as a user equipment (UE), may be used in the providing of services, including emergency services, location-based sales or marketing, and so forth. The location of the communications device may also be used in the selection of access nodes, handover targets, and so on.

A generic technique used in determining the location of a communications device includes the communications device transmitting a signal, which is received and measured at multiple measuring devices. Measurements from each of the multiple measuring devices are provided to an entity in the core network, which determines the location of the communications device based on the measurements. The timing of the serving access node of the communications device must be known by the measuring devices in order for the technique to work. However, some measuring devices in modern communications systems are asynchronous in nature or they have timing structure, but are not synchronized with the serving access node. Therefore, there is a need for a system and method for providing a timing reference at asynchronous devices and devices without a time frame structure.

SUMMARY

According to a first aspect, a method of determining a timing of an uplink signal is provided. The method includes receiving, by a measuring device, timing information associated with an uplink signal and a numerology of the uplink signal, wherein the timing information is used to determine a reference time of the uplink signal received from a user equipment (UE), receiving, by the measuring device, from the UE, the uplink signal, wherein the receiving is in accordance with the timing information and the numerology of the uplink signal, and measuring, by the measuring device, an uplink relative time of arrival (UL RTOA) in accordance with the received uplink signal and the reference time of the uplink signal.

In a first implementation form of the method according to the first aspect as such, wherein the reference time of the uplink signal is a configured time indicating a start of a slot containing the uplink signal.

In a second implementation form of the method according to the first aspect as such or any preceding implementation form of the first aspect, wherein the measured UL RTOA is a difference between the reference time of the uplink signal and a time of a start of a slot containing the received uplink signal.

In a third implementation form of the method according to the first aspect as such or any preceding implementation form of the first aspect, wherein the timing information comprises the reference time of the uplink signal, a slot number of the slot containing the uplink signal, and a radio frame number of a radio frame containing the slot.

In a fourth implementation form of the method according to the first aspect as such or any preceding implementation form of the first aspect, wherein the timing information comprises a radio frame initialization time indicating a time of a start of a radio frame zero.

In a fifth implementation form of the method according to the first aspect as such or any preceding implementation form of the first aspect, wherein reference time of the uplink signal is determined in accordance with at least one of the timing information, the numerology of the uplink signal, or an uplink signal configuration at the measuring device.

In a sixth implementation form of the method according to the first aspect as such or any preceding implementation form of the first aspect, further comprising adjusting, by the measuring device, the reference time of the uplink signal.

In a seventh implementation form of the method according to the first aspect as such or any preceding implementation form of the first aspect, wherein adjusting the reference time of the uplink signal includes receiving, by the measuring device, a timing advance (TA) associated with the UE, and subtracting, by the measuring device, the TA from the reference time of the uplink signal.

In an eighth implementation form of the method according to the first aspect as such or any preceding implementation form of the first aspect, wherein the reference time of the uplink signal is a configured time indicating a start of a slot containing the uplink signal with respect to a configurable reference time minus a timing advance.

According to a second aspect, a method of determining a timing of an uplink signal is provided. The method includes transmitting, by a measuring device, a synchronization signal block (SSB) including a timing configuration of the measuring device, receiving, by the measuring device, from a UE, an uplink signal in accordance with the timing configuration of the measuring device, and measuring, by the measuring device, an UL RTOA in accordance with the received uplink signal and a reference time of the uplink signal.

In a first implementation form of the method according to the second aspect as such, wherein the reference time of the uplink signal is a time of a start of a radio frame i at the measuring device, wherein i is a non-negative integer value, wherein the measured UL RTOA is a difference between the reference time of the uplink signal and a time of a start of a radio frame i that is calculated at the measuring device in accordance with the received uplink signal.

In a second implementation form of the method according to the second aspect as such or any preceding implementation form of the second aspect, wherein the reference time of the uplink signal is a time of a start of a slot containing the uplink signal in a radio frame j at the measuring device, wherein j is a non-negative integer value, wherein the measured UL RTOA is a difference between the reference time of the uplink signal and a time of a start of a slot containing the uplink signal in a radio frame j that is calculated at the measuring device in accordance with the received uplink signal.

In a third implementation form of the method according to the second aspect as such or any preceding implementation form of the second aspect, further comprising adjusting, by the measuring device, the measured UL RTOA.

In a fourth implementation form of the method according to the second aspect as such or any preceding implementation form of the second aspect, wherein adjusting the measured UL RTOA comprises adding, by the measuring device, a TA associated with the UE to the measured UL RTOA.

According to a third aspect, a method of a UE is provided. The method includes determining, by the UE, timing information associated with a measuring device, and transmitting, by the UE, to the measuring device, an uplink signal in accordance with the timing information.

In a first implementation form of the method according to the third aspect as such, wherein determining the timing information includes detecting, by the UE, a SSB associated with the measuring device, and determining, by the UE, a radio frame number and a radio frame boundary associated with the measuring device in accordance with a physical broadcast channel (PBCH) of the SSB and a content of the SSB.

In a second implementation form of the method according to the third aspect as such or any preceding implementation form of the third aspect, wherein the SSB is detected in accordance with at least one of a configured information of a SSB frequency associated with the measuring device, a numerology of the SSB, an information of a measurement window of the SSB, or an identifier of the measuring device.

In a third implementation form of the method according to the third aspect as such or any preceding implementation form of the third aspect, wherein the information of the measurement window comprises at least one of a periodicity of the measurement window, an offset of the measurement window, or a duration of the measurement window.

In a fourth implementation form of the method according to the third aspect as such or any preceding implementation form of the third aspect, wherein the SSB is detected in accordance with information included in a radio resource control (RRC) information element.

In a fifth implementation form of the method according to the third aspect as such or any preceding implementation form of the third aspect, further comprising obtaining, by the UE, a TA for transmissions to the measuring device.

According to a fourth aspect, a measuring device is provided. The measuring device includes a non-transitory memory storage comprising instructions, and one or more processors in communication with the memory storage. Therein the one or more processors execute the instructions to implement a method in accordance with any one of the implementation forms of the first or second aspects.

According to a fifth aspect, a UE is provided. The UE includes a non-transitory memory storage comprising instructions, and one or more processors in communication with the memory storage. The one or more processors execute the instructions to implement a method in accordance with any one of the implementation forms of the third aspect.

An advantage of a preferred embodiment is that system and method for the determining of a timing reference for uplink reference signal detection at asynchronous measuring devices and measuring devices that do not have time frame structure is provided. The system and method enables the measuring devices to detect the reference signals that use sequence, group, or frequency hopping.

Yet another advantage of a preferred embodiment is that reference signal transmissions based on the timing of an asynchronous measuring device is enabled.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable concepts that can be embodied in a wide variety of specific contexts. The specific embodiments discussed are merely illustrative of specific ways to make and use the embodiments, and do not limit the scope of the disclosure.

Figure 1:
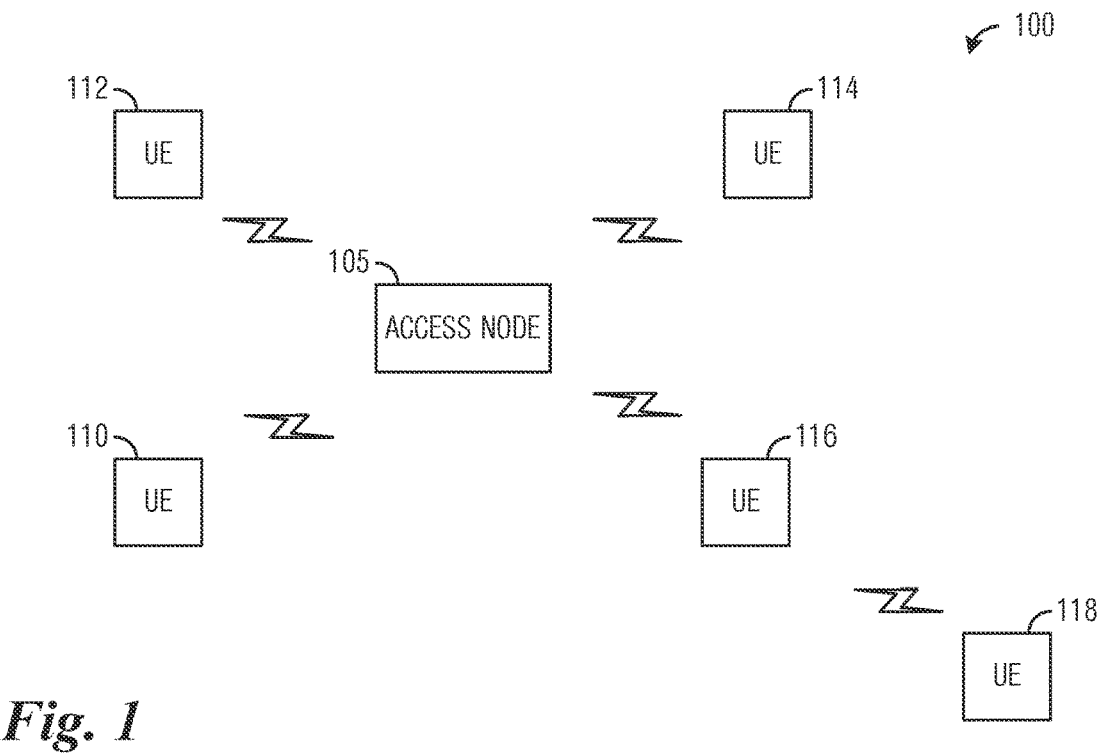
FIG. 1 is a illustrates an example communications system.

FIG. 1 illustrates an example communications system 100. Communications system wo includes an access node 105 serving a user equipment (UE) 115. In a first operating mode, communications to and from UE 115 pass through access node 105. In a second operating mode, communications to and from UE 115 do not pass through access node 105; however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G NR, High Speed Packet Access (HSPA), Wi-Fi 802.11a/b/g/n/ac/ad/ax/ay, etc. While it is understood that communications systems may employ multiple access nodes capable of communicating with a number of UEs, only one access node and five UEs are illustrated for simplicity.

Figure 2A:
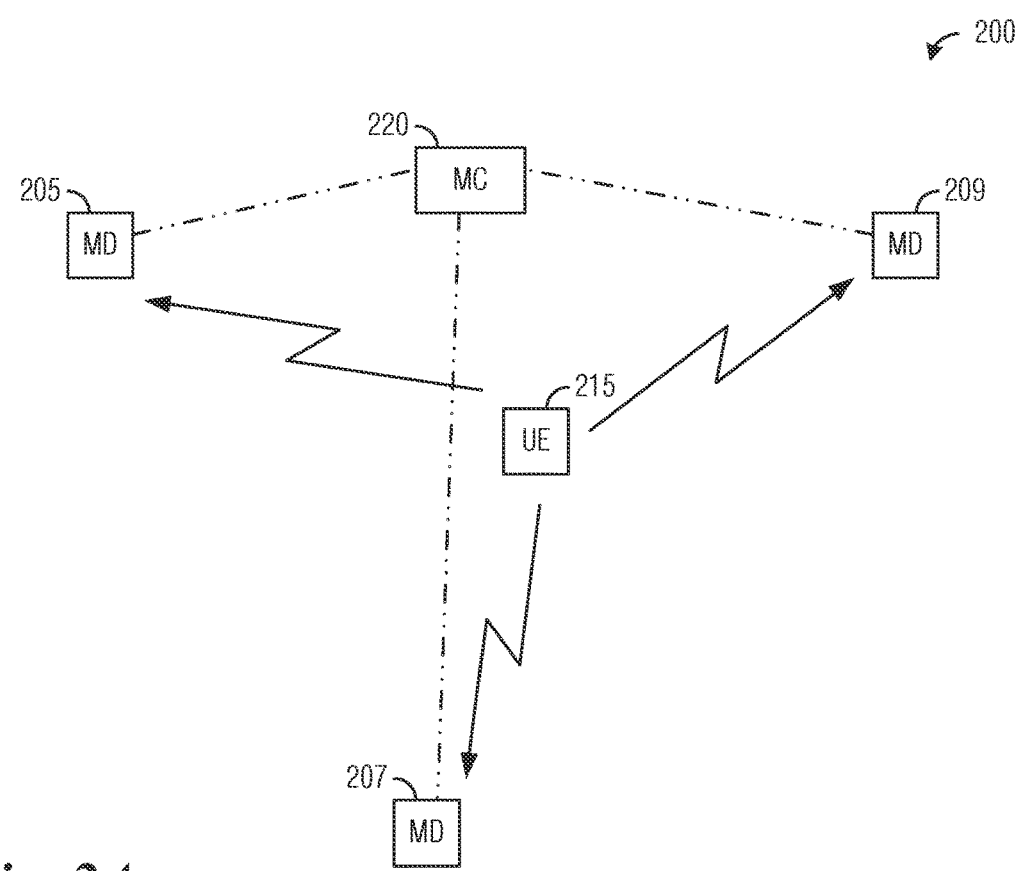
FIG. 2A illustrates a communications system highlighting the location determination of a communications device using a RTOA method.

FIG. 2A illustrates a communications system 200 highlighting the location determination of a communications device using a relative time of arrival (RTOA) method. Communications system 200 includes measuring devices (MDs), including a first MD 205, a second MD 207, and a third MD 209. Communications system 200 also includes a UE 215, the location of which is to be determined using a RTOA method. Based on measurements of signals (e.g., reference signals, such as sounding reference signal (SRS) or demodulation reference signal (DMRS), or signals transmitted on physical channels, such as a physical random access channel (PRACH), a physical uplink shared channel (PUSCH), or a physical uplink control channel (PUCCH)), transmitted by UE 215, the MDs make RTOA measurements, including: the RTOA at first MD 205, the RTOA at second MD 207, and the RTOA at third MD 209. Each measured RTOA is with respect to a reference time that can be configurable. The reference time can be common among all MDs or can be specific to each MD. The measurements made by the MDs are reported to a measurement center (MC) 220. MC 220 determines the location of UE 215 based on the measurements reported by the MDs. UE 215 and other similar devices transmitting signals may be referred to as a measurement target (MT).

A variety of network nodes may be configured as MDs. In general, an MD measures the applicable signal transmitted by a UE and reports the measurement to a MC. In the context of location or positioning applications, there may be two kinds of MDs in modern communications systems, such as in LTE and NR: MDs without timing structure (referred to herein as Type 1 nodes for the sake of brevity) and MDs with timing structure (referred to herein as Type 2 nodes for the sake of brevity).

Examples of MDs without timing structure include location measurement units (LMUs) in LTE. An LTE LMU only receives and measures the signals. The LTE LMU is unlike a normal access node or eNB that transmits and receives data and control channels to or from UEs. Hence, the LTE LMU does not operate according to a frame structure of radio access network (RAN) nodes such as eNBs, gNBs, a cell, or any other type of access node.

Examples of MDs with timing structure (which may include system frame numbers (SFNs) and frame boundaries) include eNBs, gNBs, or any other type of access node. Radio frames may also be referred to as system frames. MDs with timing structure may be further categorized into additional types, including MDs whose timing structure are aligned (referred to herein as Type 2S nodes for the sake of brevity) and MDs whose timing structure are unaligned (referred to herein as Type 2A nodes for the sake of brevity). As used here, the classification of being aligned or unaligned is with respect to a serving access node of the UE whose location is being determined.

A future LMU implementation in NR may be an MD with or without timing structure.

An MC may be an entity in the core network of a communications system that is tasked to receive the measurements from the MDs and uses the measurements to determine the location of the UE. Alternatively, an MC can be a logical or physical part of RAN nodes such as eNBs, gNBs, or any other type of access node, where the access node may be an MD. In LTE, the MC is referred to as an evolved serving mobile location center (E-SMLC), while in NR, it may be referred to as a location measurement function (LMF) or another name. Hereafter, the NR MC is referred to as an LMF for the sake of brevity. A communications system may have one or more MCs.

Figure 2B:
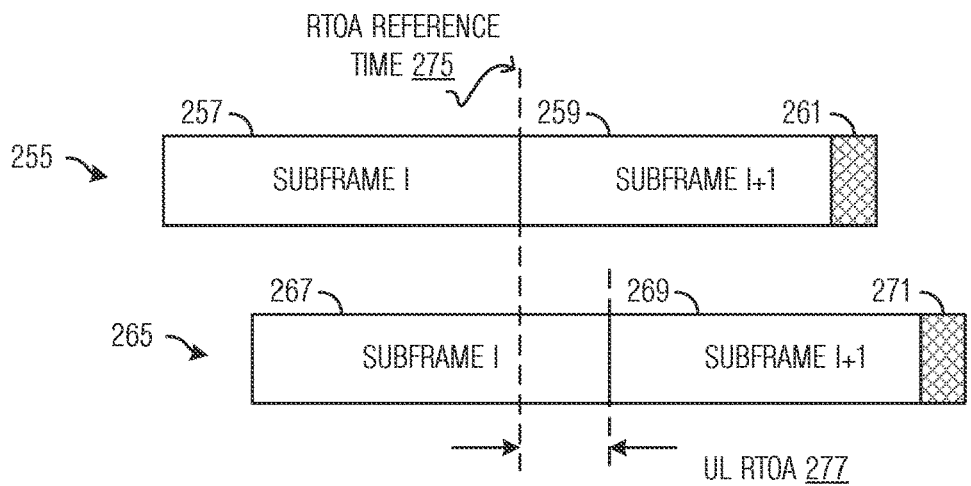
FIG. 2B illustrates a diagram of an example determining of a RTOA.

FIG. 2B illustrates a diagram 250 of an example determining of a RTOA. A first sequence of subframes 255 represents a nominal time of a plurality of subframes 257 and 259. Subframe 259 includes a SRS resource 261. A second sequence of subframes 265 represents an actual time of a plurality of subframes 267 and 269 as the subframes are received at a MD. SRS resource 271 represents SRS resource 261 as it is received at the MD. An RTOA reference time 275 corresponds to a start of subframe 259. An UL RTOA 277 is a difference between RTOA reference time 275 and an actual time that the MD receives a start of subframe 269, which corresponds to the start of subframe 259.

As discussed previously, a technique used to determine the location of a UE involves the UE transmitting a signal (e.g., a reference signal, such as a SRS or a DMRS, or a signal on a physical channel, such as a PRACH, a PUSCH, or a PUCCH), MDs measure the signal and report the measurements to an MC, and the MC determines the location of the UE based on the measurements. The signal is configured by a serving access node (e.g., a serving gNB or a serving NR cell in NR or a serving eNB or a serving LTE cell in LTE). The configuring of the signal includes the specification of time-related information for the signal. Currently, the time-related information is based on the timing of the serving access node. The signal configuration is available at all MDs tasked to measure the signal. The signal configuration enables the MDs to detect such signals and to make measurements based on such signals.

However, if a particular MD is a node without timing structure (e.g., a Type 1 node) or a node with timing structure but the node's timing is unaligned with the serving access node (e.g., a Type 2A node), the time-related information provided in the signal configuration is not sufficient to assist the MD in detecting and measuring the signal transmitted by the UE.

For illustrative purposes, a discussion is presented herein regarding timing-related information that is needed to enable the measuring of a signal transmitted by a UE by a MD. For the discussion, the signal transmitted by the UE is a SRS, however, other signals may be transmitted by the UE such as a DMRS or a signal transmitted on a PRACH, a PUSCH, or a PUCCH. Hence, the discussion of the SRS should not be construed as being limiting to either the scope or the spirit of the example embodiments.

A first timing-related information that is needed to enable the measuring of the SRS is a SRS slot boundary. Knowledge of the SRS slot boundary enables an MD to identify SRS symbols within a slot. In NR, depending on the configuration, the SRS occupies only 1, 2, or 4 symbols out of the last 6 symbols of a slot that includes the SRS (this slot is hereby referred to herein as the SRS slot). The boundary of the SRS slot should be known at the MD to enable the MD to identify the SRS symbols within the SRS slot and detect the SRS. The SRS configuration also includes SRS periodicity and offset (specified in number of slots). Therefore, the MD, receiving the SRS periodicity and SRS configuration, is able to identify the SRS slots utilizing equation (1) expressible as $$\left(N_{slot}^{frame,\mu} n_f + n_{s,f}^{\mu} - T_{offset}\right) \bmod T_{SRS} = 0, \tag{1}$$

where $N_{slot}^{frame,\mu}$ is the number of slots per radio frame for the subcarrier spacing (SCS) index μ. For instance, for SCS of 15 KHz, $N_{slot}^{frame,\mu}=10$, $n_f$ at the serving access node, $n_{s,f}^{\mu}$ is the slot index within the radio frame (for instance, $n_{s,f}^{\mu}$ can have the value of 0 to 9 when SCS is 15 KHz), $T_{offset}$ is the slot offset given in the SRS configuration, and $T_{SRS}$ is the SRS periodicity given in the SRS configuration. Clearly, $N_{slot}^{frame,\mu} n_f + n_{s,f}^{\mu}$ is equal to the total number of slots from the slot 0 of SFN 0 to the SRS slot. Therefore, $T_{offset}$ can be interpreted as the offset with respect to slot 0 of SFN 0.

An MD with timing structure that is aligned with the serving access node has the same SFN and radio frame boundary as the serving access node. Therefore, the MD has the same $n_f$ as the serving access node at each point of time. The MD also knows the SCS from the SRS configuration or other information, and hence, the MD knows $N_{slot}^{frame,\mu}$. Therefore, given the SRS periodicity and offset, the MD can determine $n_{s,f}^{\mu}$, the SRS slot index within the radio frame.

However, for MDs without timing structure and MDs with timing structure but are unaligned with the serving access node, the above is not the case. An MD without timing structure does not have any frame structure, while an MD with timing structure but is unaligned with the serving access node has a different radio frame boundary and SFN from the serving access node and cannot utilize the equation (1) to derive $n_{s,f}^{\mu}$.

Figure 3:
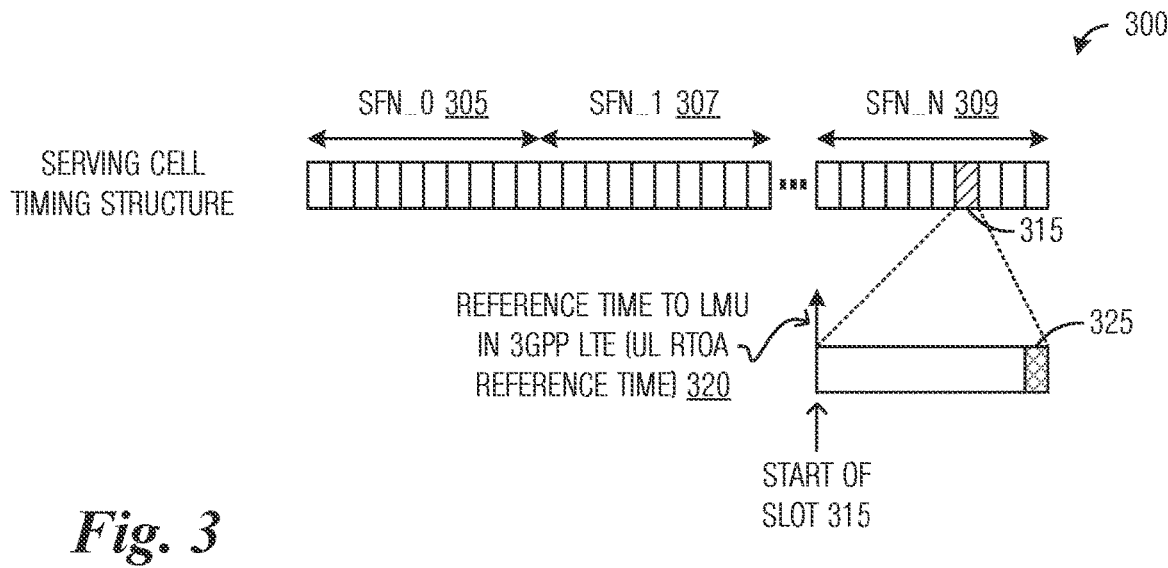
FIG. 3 illustrates a sequence of radio frames highlighting an UL RTOA reference time that provides a reference time for a SRS slot.

According to LTE, a reference time is provided to an MD without timing structure (e.g., a LTE LMU) by the core network. The reference time is referred to as an uplink RTOA (UL RTOA) reference time and specifies the time of the beginning of the SRS slot relative to 00:00:00 on Jan. 1, 1900. In other words, the reference time specifies the time of the beginning of the SRS slot relative to a configured time (00:00:00 on Jan. 1, 1900). FIG. 3 illustrates a sequence of radio frames 300 highlighting an UL RTOA reference time that provides a reference time for a SRS slot. FIG. 3 displays sequence of radio frames 300, including SFN_0 305, SFN_1 307, and SFN_N 309. SFN_N 309 includes an SRS slot 315. As shown in FIG. 3, an UL RTOA reference time 320 provides the reference time for the start of SRS slot 315. Knowledge of the start of SRS slot 315 enables an MD to identify SRS symbol 325 of SRS slot 315. Although shown in FIG. 3 as providing the reference time for the start of SRS slot 315, UL RTOA reference time 320 may provide a reference time for any portion of a SRS slot, such as an end of the SRS slot, a middle of the SRS slot, any arbitrary point (such as a particular symbol time) within the SRS slot, or even any other point of time from which the start of the SRS slot or SRS symbol can be derived. Once the start of the SRS slot (or any other agreed upon point) is determined using the UL RTOA reference time, then the locations of all recurring SRS slots are also known using the configured SRS periodicity $T_{SRS}$.

When group hopping or sequence hopping is enabled (e.g., a configuration parameter "groupOrSequenceHopping" is set to "groupHopping" or "sequenceHopping"), a second timing-related information that is needed to enable the measuring of the SRS is a radio frame boundary or a time associated therewith. The SRS used in LTE and NR is a Zadoff-Chu (ZC) sequence. Each ZC sequence is partly determined using a root sequence. In SRS sequence design, the root sequence depends on a variety of parameters, including configurable sequence identifier and SRS sequence length. Moreover, if the configuration parameter "groupOrSequenceHopping" is set to "groupHopping" or "sequenceHopping" (or equivalently, groupHopping or sequenceHopping is enabled), then the root sequence also depends upon the SRS symbol (the symbol on which the SRS sequence is mapped) index within the radio frame through parameters $f_{gh}(n_{s,f}^{\mu},l')$ and v, where $f_{gh}(n_{s,f}^{\mu},l')$ and v are expressible as equation (2):

$$f_{gh}(n_{s,f}^{\mu}, l') = \left(\sum_{m=0}^{7} c\left(8\left(n_{s,f}^{\mu} N_{symbol}^{slot} + l_0 + l'\right) + m\right) \cdot 2^m\right) \bmod 30 \tag{2}$$

$$v = 0$$

or $$f_{gh}(n_{s,f}^{\mu}, l') = 0 \tag{2}$$

$$v = \begin{cases} c\left(n_{s,f}^{\mu} N_{symbol}^{slot} + l_0 + l'\right) & M_{sc,b}^{SRS} \geq 6N_{sc}^{RB} \\ 0 & \text{otherwise} \end{cases},$$

where $N_{symbol}^{slot}$ is the number of symbols within a slot which is equal to 14, and $l_0+l'$ is the SRS symbol index within the SRS slot. Therefore $n_{s,f}^{\mu} N_{symbol}^{slot}+l_0+l'$ is the SRS symbol index from the beginning of the current radio frame.

However, in LTE, there is no known way for MDs with timing structure but are unaligned with the serving eNB to determine $n_{s,f}^{\mu}$. Additionally, $n_{s,f}^{\mu}$ is not available for MDs without timing structure. In LTE, the only information available at an MD without timing structure is the time associated with the start of the SRS slot (i.e., the location of the SRS slot is known, but its index is not known). In a representation of the radio frames where time increases from left to right, the start of a slot represents the leading edge of the slot or the first part of the slot that is injected into the channel. A challenge then exists in determining $n_{s,f}^{\mu} N_{symbol}^{slot}+l_0+l'$ from only the start of the SRS slot.

If the MD knows the start of the radio frame, as well as, the start of the SRS slot, $l_0$ and l' which are specified in the SRS configuration, the SCS (which determines the length of each symbol in the time domain), and the fact that $N_{symbol}^{slot}=14$, then the SRS symbol index from the start of the current radio frame may be determined without needing to know $n_{s,f}^{\mu}$. But, the MD can determine the start of the radio frame (only when a particular condition is met, which is explained below) from the start of the SRS slot and other information that is available to the MD, such as SRS periodicity, SRS offset.

Figure 4A:
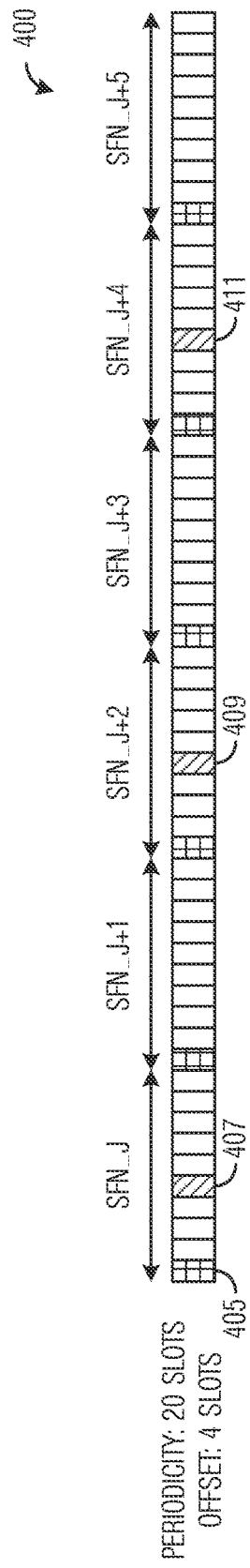
FIGS. 4A-4C illustrate the determining of the radio frame boundary from the SRS slot boundary.
Figure 4B:
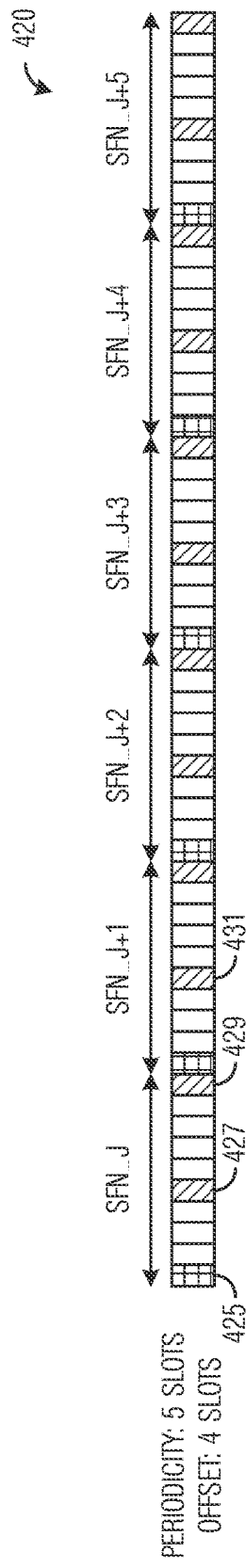
Figure 4C:
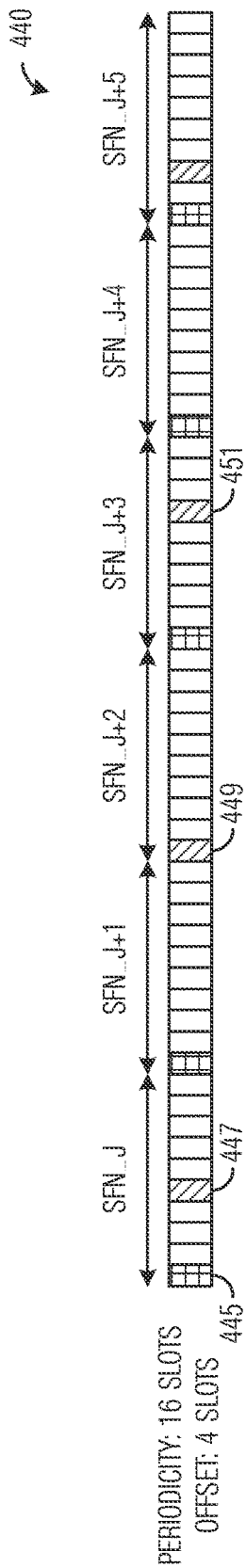

When given the SRS offset, the radio frame boundary may be determined from the SRS slot boundary only if the SRS periodicity is K times the number of slots in the frame, where K is a positive integer (i.e., K is an integer number greater than or equal to 1). FIGS. 4A-4C illustrate the determining of the radio frame boundary from the SRS slot boundary. FIG. 4A illustrates a sequence of radio frames 400 with a SRS periodicity of 20 slots and a SRS offset of 4 slots. As shown in FIG. 4A, sequence of radio frames 400 begins with slot_0 405 of SFN_j. A first SRS slot 407 occurs in slot_4 of SFN_j, and is followed by a second SRS slot 409 in slot_4 of SFN_j+2 and a third SRS slot 411 in slot_4 of SFN_j+4 due to the SRS periodicity being 2 times the number of slots in a radio frame. Because the SRS periodicity is an integer number multiple of the number of slots in the radio frame (i.e., K=2), it is possible to determine the radio frame boundary from the SRS slot boundary.

FIG. 4B illustrates a sequence of radio frames 420 with a SRS periodicity of 5 slots and a SRS offset of 4 slots. As shown in FIG. 4B, sequence of radio frames 420 begins with slot_0 425 of SFN_j. A first SRS slot 427 occurs in slot_4 of SFN_j, and is followed by a second SRS slot 429 in slot_9 of SFN_j and a third SRS slot 431 in slot_0 of SFN_j+1 due to the SRS periodicity being ½ times the number of slots in a radio frame. Because the SRS periodicity is less than a positive integer number of times the number of slots in the radio frame (i.e., K=½), it is not possible to determine the radio frame boundary from the SRS slot boundary. FIG. 4C illustrates a sequence of radio frames 440 with a SRS periodicity of 16 slots and a SRS offset of 4 slots. As shown in FIG. 4C, sequence of radio frames 440 begins with slot_0 445 of SFN_j. A first SRS slot 447 occurs in slot_4 of SFN_j, and is followed by a second SRS slot 449 in slot_0 of SFN_j+2 and a third SRS slot 451 in slot_6 of SFN_j+3 due to the SRS periodicity being a non-integer multiple of the number of slots in the radio frame. Because the SRS periodicity is not an integer multiple of the number of slots in the radio frame (i.e., K=16/10=8/5), it is not possible to determine the radio frame boundary from the SRS slot boundary.

Hence, when group hopping or sequence hopping is enabled, to determine the SRS symbol index from the start of the current radio frame, the MD needs to know the location of the start of the radio frame. In MDs without timing structure, this information generally cannot be determined from the start of the SRS slot. In MDs with timing structure that are unaligned with the serving access node, the start of neither the SRS slot nor the radio frame is known.

When SRS frequency hopping is enabled, a third timing-related information that is needed to enable the measuring of the SRS is the radio frame number, e.g., the SFN. When SRS frequency hopping is enabled, the SRS frequency location of each SRS symbol is determined using an expression that depends (in part) on $n_{SRS}$. $n_{SRS}$ is expressible as equation (3):

$$n_{SRS} = \left( \frac{N_{slot}^{frame,\mu} n_{s,f}^{\mu} - T_{offset}}{T_{SRS}} \right) \cdot \left( \frac{N_{symb}^{SRS}}{R} \right) + \left\lfloor \frac{l'}{R} \right\rfloor, \quad (3)$$

where $(N_{slot}^{frame,\mu} n_{s,f}^{\mu} - T_{offset}) \bmod T_{SRS} = 0$.

In order to determine $n_{SRS}$, the MD needs to know the SFN $n_f$. $n_f$ is the SFN of the gNB in NR or the eNB in LTE that configures the SRS, which is the serving gNB in NR or the serving eNB in LTE. $n_f$ may not be determined from the start of the SRS slot that is available to MDs without timing structure in LTE. This is also the case with MDs with timing structure but are unaligned with the serving access node.

If the start of a radio frame is known and the SFN of that frame is known, then because the SRS slot offset is part of the SRS configuration, then the SRS slot boundary may be determined if the SCS is also known at a MD. The SCS is fundamental information that should be available at the MD for any type of communication. The SRS slot boundary may be determined by the MD as follows:

The MD knows the time associated with the start of a radio frame, as well as the SFN of the radio frame. Given that each radio frame is 10 milliseconds in duration, for example, the MD rewinds 10*SFN milliseconds to determine the time associated with the start of the first radio frame SFN_0, which is also the start of slot_0 of SFN_0.

Given the SCS, the MD determines the length of a slot, which in NR is the length of 14 symbols in the time domain.

Given the SRS slot offset and the length of the slot, the MD determines the time associated with the start of the first SRS slot.

The times associated with the start of all other SRS slots may be determined using SRS periodicity.

When the SRS is successfully detected and measured by the MD, the MD provides an UL RTOA report to the MC (e.g., the LMF in NR or the E-SMLC in LTE). The UL RTOA report procedure in LTE is presented herein as an example, where the notation X→Y denotes that Y is the recipient of information from X:

Primary cell (Pcell)→E-SMLC: SFN Initialization time is provided per each serving access node that configures SRSs.

E-SMLC→LMU: One common UL RTOA reference time is provided for all serving access nodes that have configured SRSs.

UL RTOA reference time is provided to the LMU in reference to the SFN initialization time.

UL RTOA reference time indicates the beginning of the SRS subframe based on the serving cell's downlink frame structure.

LMU→E-SMLC: Reports the UL RTOA as the beginning of subframe i containing SRS relative to the configurable reference time (i.e., the UL RTOA reference time). The E-SMLC in LTE is the entity that gathers the UL RTOA reports and determines the location of the UE from the reports. In NR, a LMF serves a similar function.

According to LTE, the UL RTOA values in the UL RTOA reports are all positive. Although the UL RTOA reports in 3GPP LTE only allow positive values, negative UL RTOA values are possible and are valid values. A negative UL RTOA value may occur when the distance between MD and UE is less than the distance between the serving access node and the UE, for example.

Figure 5:
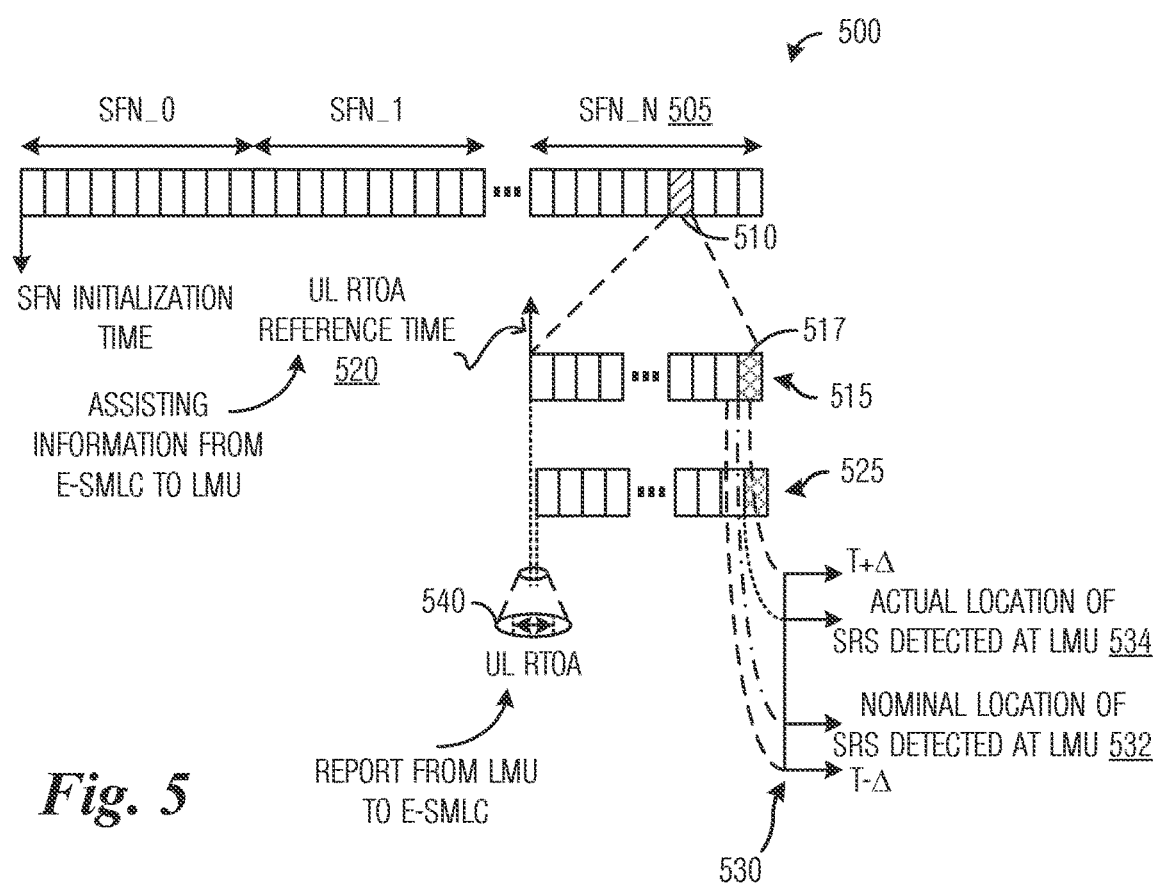
FIG. 5 illustrates a sequence of radio frames highlighting a positive UL RTOA.

FIG. 5 illustrates a sequence of radio frames 500 highlighting a positive UL RTOA. Sequence of radio frames 500 includes a plurality of radio frames, including SFN_N 505, which includes a SRS slot 510. Slot 515 is a detailed view of SRS slot 510 and includes SRS symbol 517. Also shown in FIG. 5 is UL RTOA reference time 520, which indicates the start of slot 515 (SRS slot 510). Slot 515 represents the nominal time of the SRS slot in the time domain, which is the time of the SRS slot at the serving access node. Slot 525 is also a detailed view of SRS slot 510, but represents the actual time of SRS slot in the time domain as detected at the MD, which is the time of the SRS slot as it is detected at the MD. Timeline 530 illustrates the occurrence of nominal location 532 of the SRS symbol and actual location 534 of when the SRS symbol is detected at the MD (e.g., the LMU, the gNB, or the NR cell). The difference between an actual location and the nominal location (in the time domain) of SRS slot 510 (represented in FIG. 5 as slots 515 and 525) is the UL RTOA (e.g., UL RTOA 540) reported by the MD to the MC. Actual location 534 occurs later in time than nominal location 532 due to the propagation delay differences arising from the distance differences between the serving access node, the UE, and the MD. Because actual location 534 occurs later in time than nominal location 532, the UL RTOA is positive.

Figure 6:
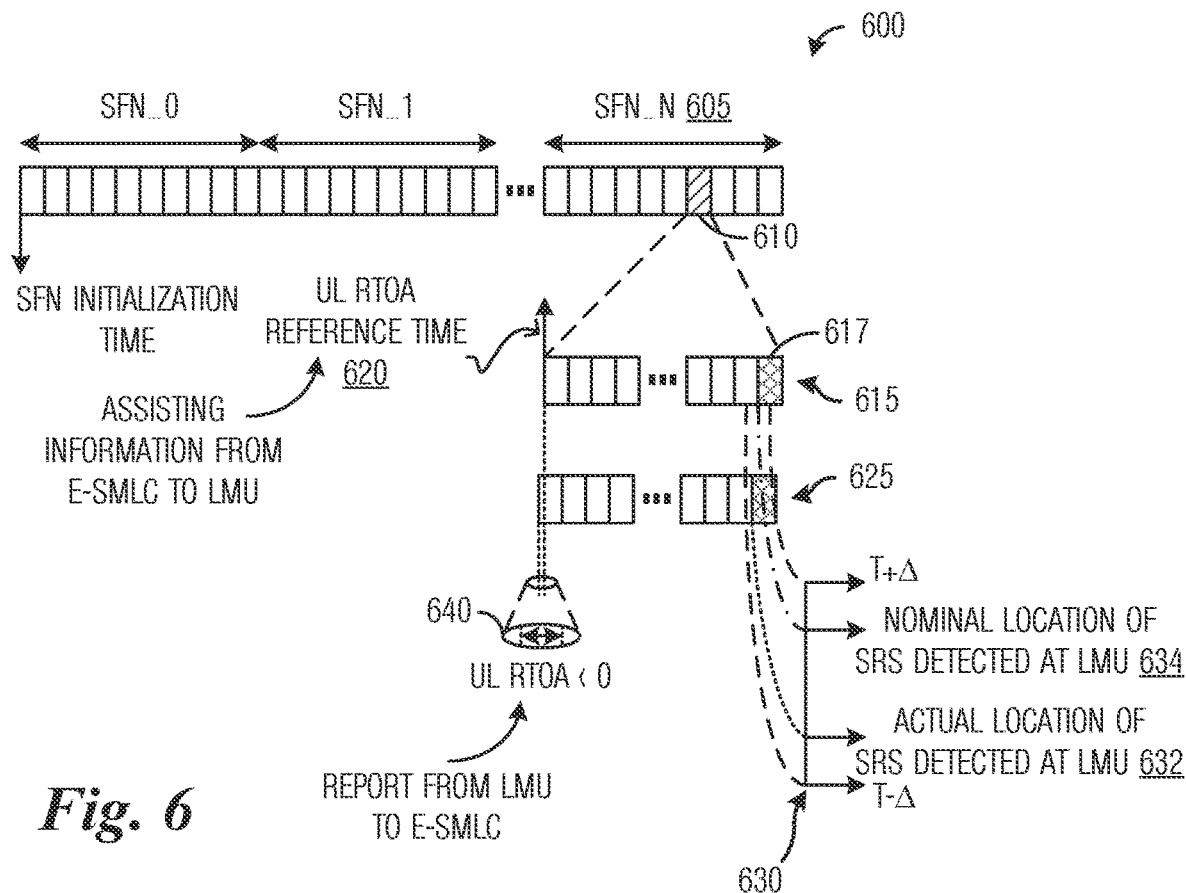
FIG. 6 illustrates a sequence of radio frames highlighting a negative UL RTOA.

FIG. 6 illustrates a sequence of radio frames 600 highlighting a negative UL RTOA. Sequence of radio frames 600 includes a plurality of radio frames, including SFN_N 605, which includes a SRS slot 610. Slot 615 is a detailed view of SRS slot 610 and includes SRS symbol 617. Also shown in FIG. 6 is UL RTOA reference time 620, which indicates the start of slot 615 (SRS slot 610). Slot 615 represents the nominal time of the SRS slot in the time domain at the serving access node. Slot 625 is also a detailed view of SRS slot 610, but represents the actual time of the SRS slot in the time domain as detected at the MD. Timeline 630 illustrates the occurrence of actual 632 and nominal 634 locations in the time domain of when the SRS symbol is detected at the MD (e.g., the LMU). The difference between actual location 632 and nominal location 634 (in the time domain) of SRS slot 610 (represented in FIG. 6 as slots 615 and 625) is the UL RTOA (e.g., UL RTOA 640) reported by the MD to the MC. Actual location 632 occurs earlier in time than nominal location 634 due to the propagation delay differences arising from the distance differences between the serving access node, the UE, and the MD. Because actual location 632 occurs earlier in time than nominal location 634, the UL RTOA is negative.

With respect to determining a device's location or position, NR includes some differences when compared to LTE. The differences include:

There is no LMU in NR, and the gNB receives the SRS;

The SRS may be transmitted directionally (i.e., the SRS may be beamformed) so multiple SRS sources may be needed to support determining a device's location or position; and The configuration of SRS resources is more flexible.

Therefore, a common uplink frame timing between multiple SRS resources is desired. Because the SRS is configured in the serving cell, the uplink frame timing may be based on the serving cell. Furthermore, to reduce interference to neighbor cells, an additional timing advance (e.g., a different timing advance) compared to the timing advance of the serving cell may be applied. When the gNB reports the UL RTOA to the LMF, the timing advance (when applied) should be considered in deriving the UL RTOA.

It is noted that determining the UL RTOA is simplified if SRS timing is based on that of the serving cell. Due to the greater flexibility of the SRS resource configuration (including group or sequence hopping, and frequency hopping) it is beneficial that the neighbor gNBs be aware of the frame timing to properly receive the SRS (e.g., detect the SRS sequence or SRS frequency hop). It may be possible to indicate to the neighbor cells the SFN initialization time of the serving cell, so that the neighbor cells can detect and measure the SRS resources on its own. The SFN initialization time is the time associated with the start of slot_0 of SFN_0 with respect to another point on the time axis that is known among all MDs (e.g., gNBs). This point on the time axis can be a configurable time such as 00:00:00 on Jan. 1, 1900 or any other point on the time axis that is known among all MDs.

According to an example embodiment, in order to the support the detection and measurement of the SRS, where the group and sequence hopping, along with frequency hopping is enabled, by MDs without timing structure or MDs with timing structure but are unaligned with the serving access node, information allowing the MDs to determine the SFN, the frame boundary, and the SCS (the numerology of the SRS) is provided. The information, provided by the UE, the serving access node, a network entity, or a combination of the UE, the serving access node, or the network entity, allows the MDs to determine the SFN, the frame boundary, and the SCS, thereby enabling the MDs to detect the SRS and make measurements thereof. In a situation where there are multiple SRS numerologies (such as in NR), the numerology helps the MDs to identify SRS slots. Hence, in LTE where there is a single SRS numerology, the numerology does not need to be provided to the MDs. But in communications systems where there are multiple SRS numerologies, the numerology associated with the SRS slot is also provided to the MDs.

According to an example embodiment, the information provided to the MDs includes timing information (such as one or more of the SFN initialization time, SFN number, start of the radio frame, start of the SRS slot, and so on) associated with the SRS, and a numerology associated with the SRS. The MDs receiving the timing information and the numerology may be able to determine (e.g., locate or identify) the SRS slot(s) and may be able to detect and measure the SRS conveyed therein. The timing information may be provided by the UE, the serving access node, a network entity, or a combination of the UE, the serving access node, or the network entity. The numerology may be provided by the UE, the serving access node, a network entity, or a combination of the UE, the serving access node, or the network entity.

In an embodiment, the timing information comprises a reference time that is equal to the SFN initialization time. The SFN initialization time is the time associated with the start of slot_0 of SFN_0 with respect to another point on the time axis that is known among all MDs (e.g., gNBs). This point on the time axis can be a configurable time such as 00:00:00 on Jan. 1, 1900 or any other point on the time axis that is known among all MDs. SFN initialization time can be referred to as the UL RTOA reference time. Yet in another alternative embodiment, UL RTOA reference time may be the start of the slot that is obtained using SFN initialization time, SRS SCS, as well as the SRS periodicity and SRS offset. In this embodiment, the reference time provided to the MDs comprises the time corresponding to the start of slot_0 of SFN_0, which corresponds to the very first slot of the sequence of radio frames that includes the SRS slots. The numerology associated with the SRS is the SRS SCS.

Although the discussion focuses on an embodiment where the reference time specifies the time associated with the start of slot_0 of SFN_0, the example embodiments presented herein are operable with other reference times that specify other parts of the sequence frames. The use of the SFN initialization time and the numerology to identify the SRS slot(s) has applicability in both MDs without timing structure and MDs with timing structure but are unaligned with the serving access node. The MDs can determine the SRS slot boundary, the frame boundary, and the radio frame number from the reference time and the numerology, as well as, the SRS periodicity and SRS offset where the latter two information are part of the SRS configuration that is available to the UE and the MDs.

Figure 7:
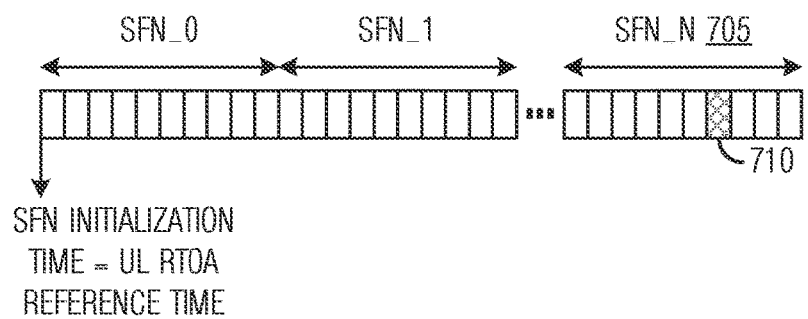
FIG. 7 illustrates a sequence of radio frames highlighting a SFN initialization time as the reference time according to example embodiments presented herein.

FIG. 7 illustrates a sequence of radio frames 700 highlighting a SFN initialization time as the reference time. Sequence of radio frames 700 includes SFN_N 705, which includes a SRS slot 710. The MD receives the SFN initialization time 715 specifying the time associated with the start of slot_0 of SFN_0 as the reference time (i.e., the UL RTOA reference time). Using the SFN initialization time and the numerology of the SRS, as well as the SRS periodicity and SRS offset where the latter two information are part of the SRS configuration that is available to the UE and the MDs, the MD is able to identify SRS slot 710, and detect and measure the SRS included therein.

In an embodiment, the timing information comprises the reference time which is the time associated with the start of the SRS slot, which may be alternatively referred to as the UL RTOA reference time, the SFN of the radio frame including the SRS slot, and the slot number of the SRS slot within the radio frame. In other words, the timing information provided to the MDs directly identifies the SRS slot. Although the discussion focuses on an embodiment where the reference time is a reference to the start of the SRS slot, the example embodiments presented herein are operable with other reference times that identify other parts of the SRS slot, including a particular symbol within the SRS slot, the end of the SRS slot, the middle of the SRS slot, and so on. The use of the time associated with the start of the SRS slot, the SFN of the radio frame including the SRS slot, and the slot number of the SRS slot, along with the numerology of SRS has applicability in both MDs without timing structure and MDs with timing structure but are unaligned with the serving access node. The MDs can determine the SRS slot boundary, the radio frame boundary, and the radio frame number from the information carried in the timing information and the numerology.

In an embodiment, the timing information comprises the reference time which is the time associated with the start of the SRS slot, which may be alternatively referred to as the UL RTOA reference time, and the SFN of the radio frame including the SRS slot. In other words, the timing information provided to the MDs directly identifies the SRS slot. Although the discussion focuses on an embodiment where the reference time is a reference to the start of the SRS slot, the example embodiments presented herein are operable with other reference times that identify other parts of the SRS slot, including a particular symbol within the SRS slot, the end of the SRS slot, the middle of the SRS slot, and so on. The use of the time associated with the start of the SRS slot and the SFN of the radio frame including the SRS slot along with the numerology of SRS has applicability in both MDs without timing structure and MDs with timing structure but are unaligned with the serving access node. The MDs can determine the SRS slot boundary, the radio frame boundary, and the radio frame number from the information carried in the timing information and the numerology as well as the SRS periodicity and SRS offset where the latter two information are part of the SRS configuration that is available to the UE and the MDs.

According to an example embodiment, in order to the support the detection and measurement of the SRS, the UE transmits the SRS utilizing the timing of the MDs. The transmission of the SRS using the timing of the MDs enables the MDs to readily determine (e.g., locate or identify) the SRS slots and measure the SRS. In an embodiment, in a situation where there are MDs with different timing, the UE transmits the SRS multiple times, each time utilizing a different timing associated with a particular MD to which the UE is transmitting the SRS. If the SRS is transmitted with a timing that differs from the timing of a particular MD, the particular MD will not be able to determine the location of the SRS slots and measure the SRS. In a communications system where beamforming is utilized to compensate for high pathloss, the necessity of transmitting different SRS to different MDs is not necessarily a significant additional burden.

In an embodiment, the UE obtains the timing (e.g., the SFN and the radio frame boundary) of an MD by detecting synchronization signal/physical broadcast channel (PBCH) blocks (SSBs) and analyzing the PBCH content transmitted by the MDs. As an example, the UE receives a configuration of the SSB, including SSB frequency, SSB SCS, SSB measurement window (such as periodicity, offset, duration, and so on), and identifier of the MD. As another example, the UE detects SSBs to obtain the timing of the MD utilizing a configured measurement object (such as a MeasObjectNR in NR). In such a situation, the identifier of the MD may be included in a field in MeasObjectNR such as SSB-MTC2. In many applications, the UE typically measures the SSBs of neighboring access nodes, for mobility purposes, for example, so little additional overhead is incurred. The requirement regarding MDs transmitting SSBs may limit this example embodiment to MDs with timing structure but unaligned with the serving access node.

In an example, the UL RTOA reference time is a nominal time of the start of a radio frame i (i.e., time of the start of a radio frame i at the serving cell or the serving gNB), where i is a non-negative integer (i.e., i is equal to or greater than zero), and the UL RTOA measured by the MD is a difference between an actual time of the start of the radio frame i as it is received by the MD and the UL RTOA reference time. In another example and as discussed above, the UL RTOA reference time is a nominal time of the start of the SRS slot (i.e., time of the start of the SRS slot at the serving cell or the serving gNB), and the UL RTOA measured by the MD is a difference between an actual time of the start of the SRS slot as it is received by the MD and the UL RTOA reference time.

In such an example embodiment, a proper timing advance (TA) at the UE may not be known. As currently defined, the TA at the UE is used to compensate for the propagation delay and make an uplink signal transmitted by the UE be received at the network side within the cyclic prefix (CP) time from the beginning of the symbol in the timing structure of the serving access node. In other words, the TA is an adjustment to transmission timing at a transmitting device so that the transmission arrives at a receiving device at a specified time within a specified time margin. As discussed previously, in location service applications, the MD receiving the SRS may be a node that is not a serving access node. In an embodiment, the network provides the UE with a nominal TA. The TA provided by the network (e.g., the serving access node, a network node, a network entity, or so on) should be taken into consideration when determining the distance based on the UL RTOA at the network side. The TA may be considered in the UL RTOA reports from the MDs to the MC. In such a situation, the TA should also be known at the MDs or at the MC. The nominal TA may be determined based on the TA of the UE towards the serving access node (the uplink timing), relative distance of the serving access node and the MD, and the approximate UE location. In another embodiment, a longer search window for SRS detection is used at the MD.

According to an example embodiment, when timing information comprises the reference time which is the time associated with the start of the SRS slot, which may be alternatively referred to as the UL RTOA reference time, the SFN of the radio frame including the SRS slot, and the slot number of the SRS slot within the radio frame or when the timing information comprises the reference time which is the time associated with the start of the SRS slot, which may be alternatively referred to as the UL RTOA reference time, and the SFN of the radio frame including the SRS slot, then negative UL RTOA value support is provided. As discussed previously, negative UL RTOA values are not supported in UL RTOA reports in LTE. However, negative UL RTOA values are valid values, hence not reporting them can lead to sub-optimal location-based performance. In an embodiment, UL RTOA reports are modified to allow for negative UL RTOA values. In an embodiment, the UL RTOA values are adjusted so that the values are relative to the UL RTOA reference time minus any TA. In such an embodiment, the TA is provided to the MDs. In an embodiment, the TA is considered in the UL RTOA reference time.

According to an example embodiment, when the timing information is comprised of a reference time that is equal to the SFN initialization time, then the UL RTOA reference time is determined based on the SFN initialization time. In an embodiment, UL RTOA reports are modified to allow for negative UL RTOA values. In an embodiment, the UL RTOA values are adjusted so that the values are relative to the UL RTOA reference time minus any TA. In such an embodiment, the TA is not only known at the UE but the TA is also provided to the MDs. In an embodiment, the TA is considered in the UL RTOA reference time.

Figure 8:
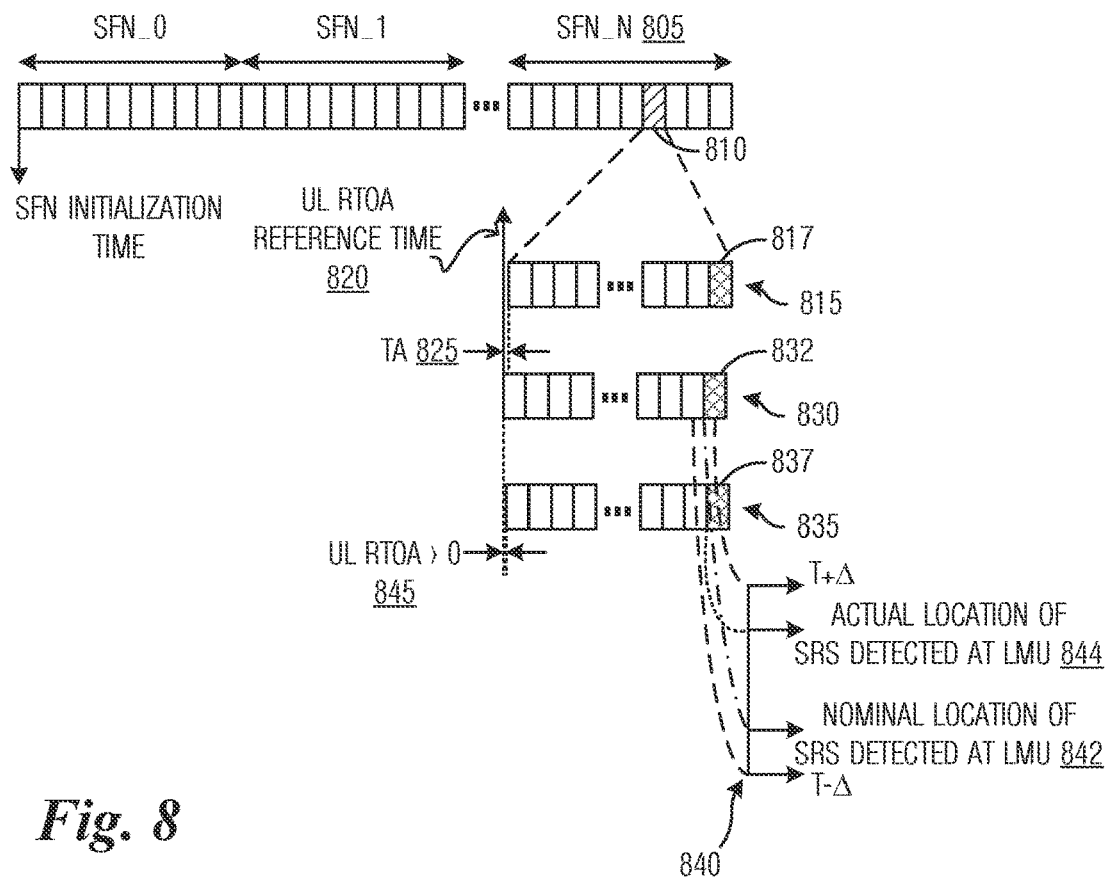
FIG. 8 illustrates a sequence of radio frames highlighting TA consideration in determining the UL RTOA reference time according to example embodiments presented herein.

FIG. 8 illustrates a sequence of radio frames 800 highlighting TA consideration in determining the UL RTOA reference time. Sequence of radio frames 800 includes a plurality of radio frames, including SFN_N 805, which includes SRS slot 810. Slot 815 is a detailed view of SRS slot 810 and includes SRS symbol 817. Also shown in FIG. 8 is slot 830, which is also a detailed view of SRS slot 810. However, slot 830 differs from slot 815 in that slot 830 is offset from slot 815 by TA 825. Slot 830 represents the nominal SRS slot in the time domain at the serving access node with compensation provided for the TA. Slot 830 includes SRS symbol 832. Slot 835 is also a detailed view of SRS slot 810, but represents the actual time of the SRS slot in the time domain as detected at the MD. Slot 835 includes SRS symbol 837. Timeline 840 illustrates the occurrence of nominal 842 and actual 844 locations of when the SRS symbol is detected at the MD (e.g., the LMU or gNB). The difference between nominal location 842 and actual location 844 (in the time domain) of SRS slot 810 (represented in FIG. 8 as slots 830 and 835) is the UL RTOA (e.g., UL RTOA 845) reported by the MD to the MC.

According to an example embodiment, when the UE transmits the SRS utilizing the timing of the MDs, the UL RTOA is determined based on a difference between the nominal location of the SRS slot (i.e., based on the UL RTOA reference time) and the SRS slot as received by the MD. In an embodiment, TA is also considered in the UL RTOA. As an example, the UL RTOA is determined in accordance with an expression expressible as:

$$UL\ RTOA = A - B + C,$$

where A is the beginning of the radio frame calculated based on the actual time of the received SRS received by the MD, B is the beginning of the radio frame based on the nominal time of the received SRS, and C is the TA or 0. If C is 0, the MC may add the TA to the UL RTOA report when determining the location of the UE. In another embodiment, A is the beginning of the SRS slot calculated based on the actual time of the received SRS received by the MD, B is the beginning of the SRS slot based on the nominal time of the received SRS, and C is the TA or 0. If C is 0, the MC may add the TA to the UL RTOA report when determining the location of the UE.

Figure 9:
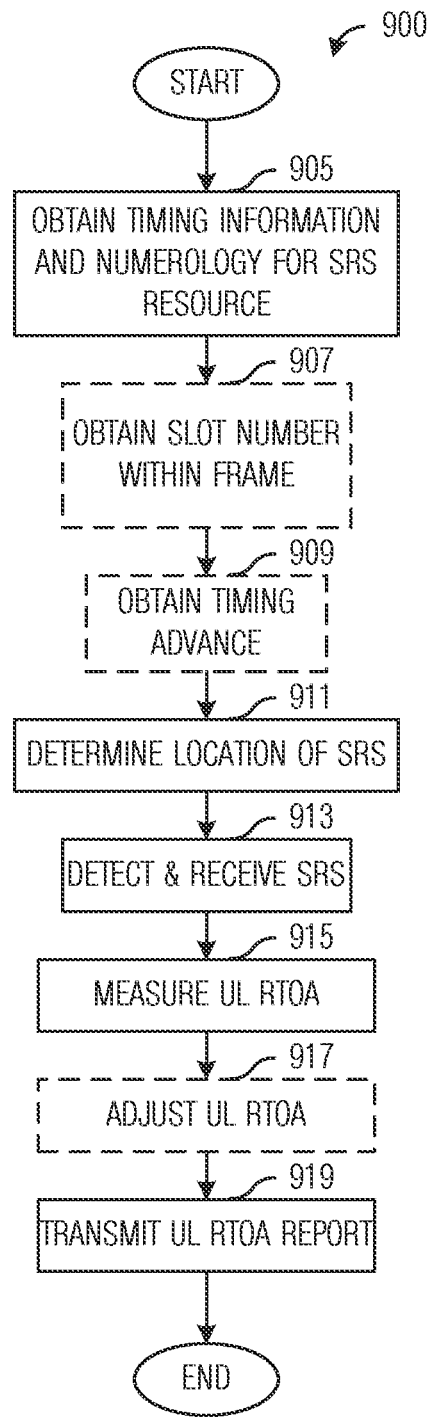
FIG. 9 illustrates a flow diagram of example operations occurring in an MD detecting and receiving a signal (such as an SRS) transmitted by a UE and measuring the signal to determine an UL RTOA according to example embodiments presented herein.

FIG. 9 illustrates a flow diagram of example operations 900 occurring in an MD detecting and receiving a signal (such as an SRS) transmitted by a UE and measuring the signal to determine an UL RTOA. Operations 900 may be indicative of operations occurring in an MD as the MD detects and receives a signal transmitted by a UE and measures the signal to determine an UL RTOA.

Operations 900 begin with the MD obtaining timing information associated with the signal and a numerology associated with the signal (block 905). Obtaining the timing information and the numerology may include receiving the timing information and the numerology. In an embodiment, the timing information comprises a SFN initialization time. In other words, the timing information comprises a start of a slot 0 of a radio frame zero (e.g., SFN 0) with respect to a configurable reference time. In another embodiment, the timing information comprises the reference time which is the time associated with the start of the SRS slot, which may be alternatively referred to as the UL RTOA reference time, and the SFN of the radio frame including the SRS slot. In such an embodiment, when the periodicity of the SRS is a positive integer multiple of the number of slots per radio frame, the MD also obtains a slot number of the SRS slot. In yet another embodiment, the timing information comprises the reference time which is the time associated with the start of the SRS slot, which may be alternatively referred to as the UL RTOA reference time, the SFN of the radio frame including the SRS slot, and the slot number of the SRS slot within the radio frame (block 907). The numerology associated with the SRS includes information such as SCS, for example. The timing information may be obtained or received from the serving access node, a network entity, the UE, or a combination of the serving access node, the network entity, or the UE. The numerology may be obtained or received from the serving access node, a network entity, the UE, or a combination of the serving access node, the network entity, or the UE.

The MD may optionally obtain a TA (block 909). The TA may be obtained from the serving access node or the network entity, or a combination of the serving access node and the network entity. The TA may be received from the serving access node or the network entity, or a combination of the serving access node and the network entity. The MD determines the time and frequency resources (i.e., the location) of the signal transmission in accordance with the obtained timing information and the numerology (block 911). The MD detects and receives the signal in accordance with the determined time and frequency resources of the signal transmission (block 913). The MD measures the UL RTOA (block 915). As an example, the UL RTOA is the difference between the UL RTOA reference time and a determined time relative to the actual time that the MD receives the signal transmission. The determined time can refer to the time of the beginning of the SRS slot or the time of the beginning of the radio frame that includes SRS slot.

The MD may adjust the UL RTOA in situations where negative UL RTOA values are supported (block 917). In an embodiment, the negative UL RTOA values are adjusted so that the values are relative to the UL RTOA reference time minus any TA. In an embodiment, the TA is considered in the UL RTOA reference time. In an embodiment, the negative UL RTOA values are allowed in UL RTOA reports. In a situation when the timing information includes the SFN initialization time, then the UL RTOA reference time is determined based on the SFN initialization time and the negative UL RTOA values are adjusted so that the values are relative to the UL RTOA reference time minus any TA, the TA is considered in the UL RTOA reference time, or the negative UL RTOA values are allowed in UL RTOA reports. The MD transmits an UL RTOA report (block 919). The UL RTOA report may be sent to an MC, for example.

Figure 10A:
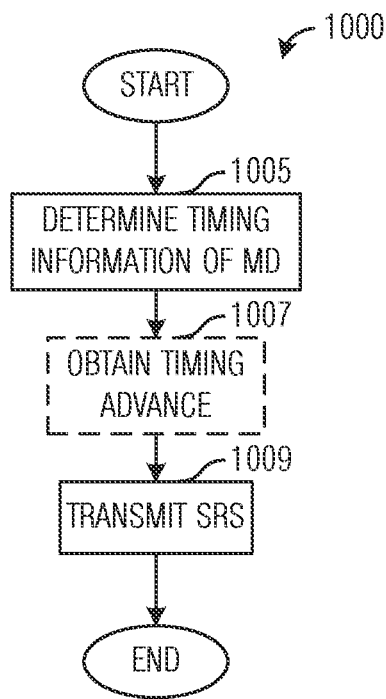
FIG. 10A illustrates a flow diagram of example operations occurring in a UE transmitting a signal (such as an SRS), when the signal is transmitted with the timing of the MD according to example embodiments presented herein.

FIG. 10A illustrates a flow diagram of example operations 1000 occurring in a UE transmitting a signal (such as a SRS), when the signal is transmitted with the timing of the MD. Operations 1000 may be indicative of operations occurring in a UE as the UE transmits a signal, when the signal is transmitted with the timing of the MD.

Operations 1000 begin with the UE determining the timing information of the MD (block 1005). The UE may determine the timing information of the MD by detecting a SSB that is associated with the MD, for example. The timing information, e.g., a SFN and a radio frame boundary, may be determined from a physical broadcast channel (PBCH) of the SSB and the contents of the SSB. As an example, the SSB may be detected utilizing configured information of the SSB, such as frequency information of the SSB that is associated with the MD, SSB numerology, information of a measurement window of the SSB (e.g., a periodicity of the measurement window, an offset of the measurement window, or a duration of the measurement window), and the identifier of the MD. As an example, the SSB may be detected using information included in a configured measurement object (such as a MeasObjectNR in NR). In such a situation, the identifier of the MD may be included in a field in MeasObjectNR such as SSB-MTC2. The UE may obtain a TA (block 1007). The TA may be obtained or received from the serving access node, a network node, a network entity, or so on. The UE transmits the signal (block 1009). The signal is sent in accordance with the timing information of the MD.

Figure 10B:
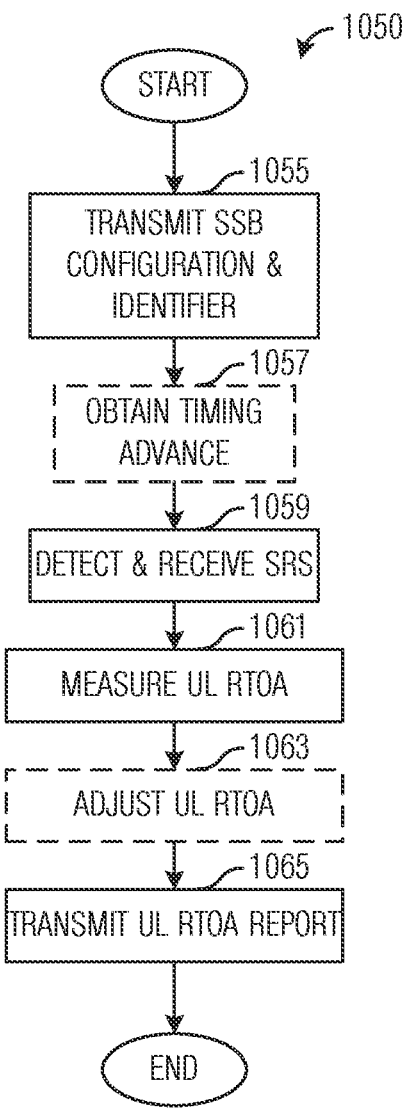
FIG. 10B illustrates a flow diagram of example operations occurring in an MD detecting and receiving a signal (such as an SRS) transmitted by a UE and measuring the signal to determine an UL RTOA, when the signal is transmitted with the timing of the MD according to example embodiments presented herein.

FIG. 10B illustrates a flow diagram of example operations 1050 occurring in an MD detecting and receiving a signal (such as a SRS) transmitted by a UE and measuring the signal to determine an UL RTOA, when the signal is transmitted with the timing of the MD. Operations 1050 may be indicative of operations occurring in an MD as the MD detects and receives a signal transmitted by a UE and measures the signal to determine an UL RTOA, when the signal is transmitted with the timing of the MD.

Operations 1050 begin with the MD transmitting a SSB (block 1055). The SSB includes the timing configuration of the MD, as well as an identifier of the MD. The MD may obtain a TA (block 1057). The TA may be obtained or received from the serving access node, a network node, a network entity, or so on. The MD detects and receives the signal (block 1059). Because the SRS is transmitted using the timing configuration of the MD, the MD knows the time and frequency resources of the signal transmission. The MD measures the UL RTOA (block 1061). As an example, the UL RTOA is the difference between the UL RTOA reference time and a determined time relative to the actual time that the MD receives the signal transmission. The determined time can refer to the time of the beginning of the SRS slot or the time of the beginning of the radio frame that includes SRS slot. The MD may adjust the UL RTOA in situations where negative UL RTOA values are supported (block 1063). The UL RTOA may be adjusted in accordance with the expression: UL RTOA=A—B+C, where A is the beginning of the radio frame calculated based on the actual time of the received SRS received by the MD, B is the beginning of the radio frame based on the nominal time of the SRS, and C is the TA or 0. If C is 0, the MC may add the TA to the UL RTOA report when determining the location of the UE. In an alternative embodiment, A is the beginning of the SRS slot calculated based on the actual time of the received SRS received by the MD, B is the beginning of the SRS slot based on the nominal time of the SRS, and C is the TA or 0. If C is 0, the MC may add the TA to the UL RTOA report when determining the location of the UE. The MD transmits an UL RTOA report (block 1065). The UL RTOA report may be transmitted to an MC, for example.

Figure 11:
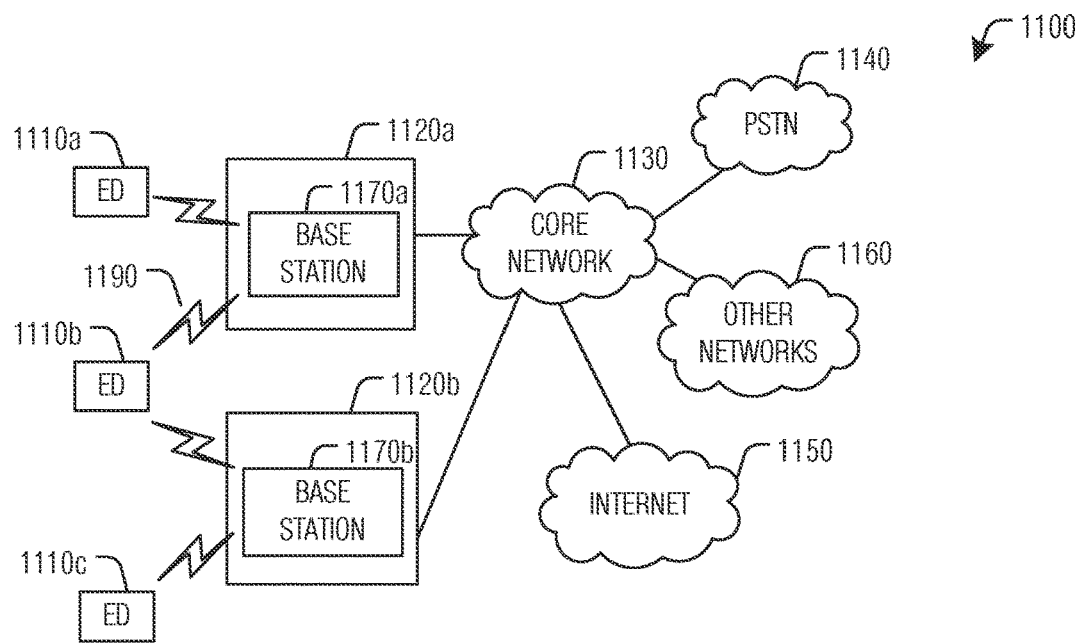
FIG. 11 illustrates an example communication system according to example embodiments presented herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 11, any number of these components or elements may be included in the system 1100.

The EDs 1110a-1110c are configured to operate or communicate in the system 1100. For example, the EDs 1110a-1110c are configured to transmit or receive via wireless or wired communication channels. Each ED 1110a-1110c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1120a-1120b here include base stations 1170a-1170b, respectively. Each base station 1170a-1170b is configured to wirelessly interface with one or more of the EDs 1110a-1110c to enable access to the core network 1130, the PSTN 1140, the Internet 1150, or the other networks 1160. For example, the base stations 1170a-1170b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1110a-1110c are configured to interface and communicate with the Internet 1150 and may access the core network 1130, the PSTN 1140, or the other networks 1160.

In the embodiment shown in Figure ii, the base station 1170a forms part of the RAN moa, which may include other base stations, elements, or devices. Also, the base station 1170b forms part of the RAN mob, which may include other base stations, elements, or devices. Each base station 1170a-1170b operates to transmit or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110a-1110c over one or more air interfaces 1190 using wireless communication links. The air interfaces 1190 may utilize any suitable radio access technology.

It is contemplated that the system 1100 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
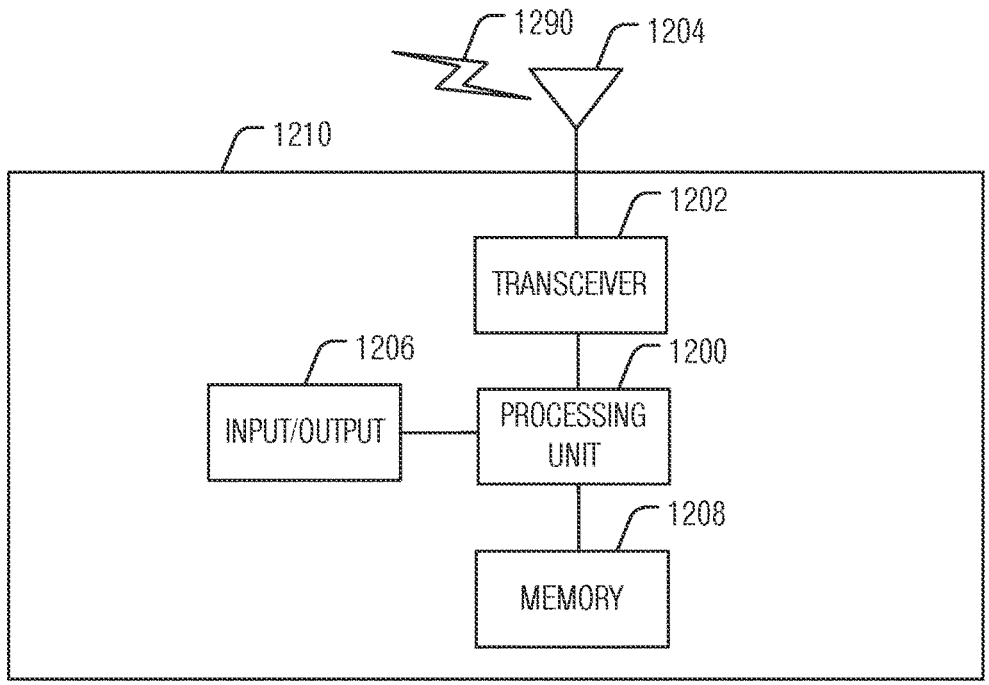
FIGS. 12A and 12B illustrate example devices that may implement the methods and teachings according to this disclosure.
Figure 12B:
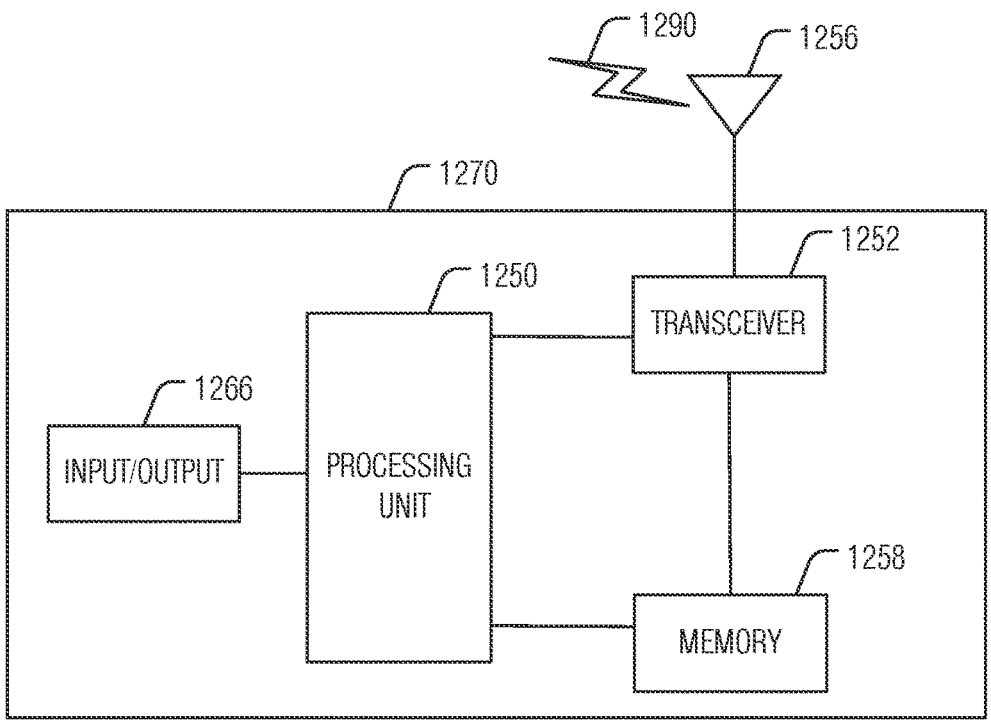

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless or wired transmission or processing signals received wirelessly or by wire. Each antenna 1204 includes any suitable structure for transmitting or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
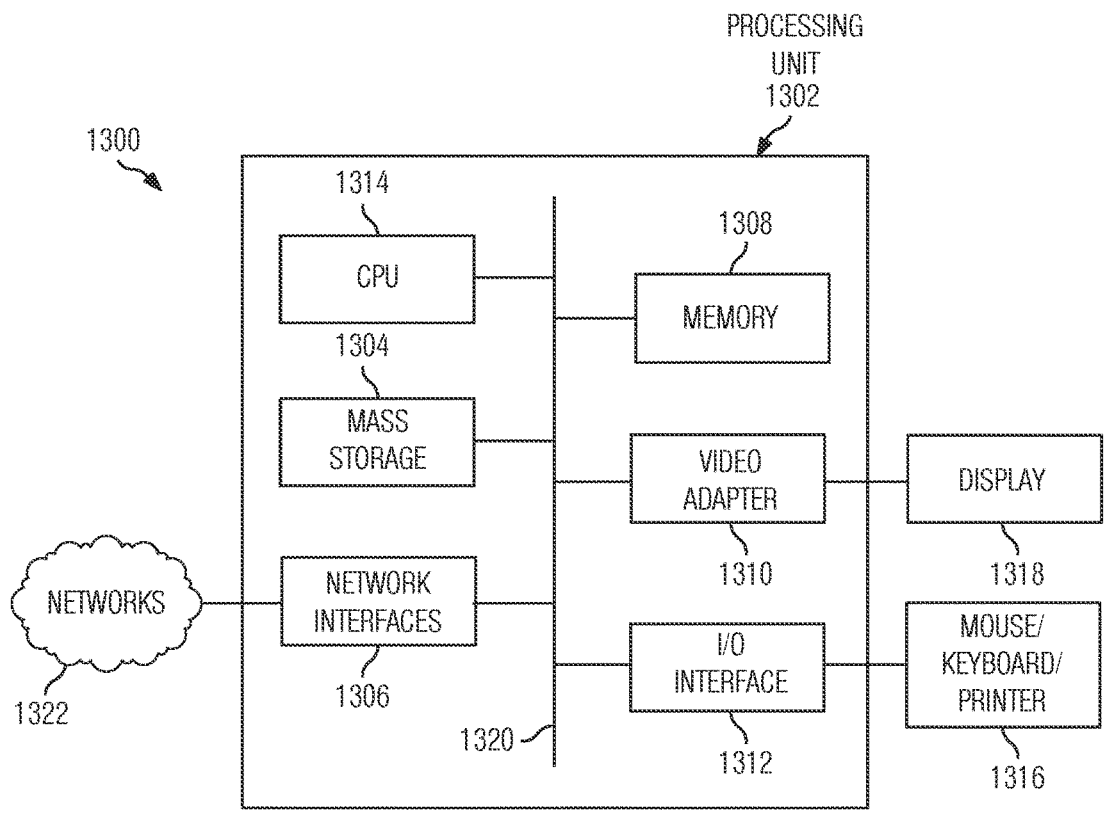
FIG. 13 is a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse, keyboard, or printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a measuring unit or module, a determining unit or module, a detecting unit or module, or a subtracting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method, comprising:
   receiving, by a measuring device, timing information associated with an uplink signal and a numerology of the uplink signal, wherein the timing information is used to determine a reference time of the uplink signal received from a user equipment (UE);
   receiving, by the measuring device from the UE, the uplink signal in accordance with the timing information and the numerology of the uplink signal; and
   measuring, by the measuring device, an uplink relative time of arrival (UL RTOA) in accordance with the uplink signal and the reference time of the uplink signal, wherein the UL RTOA is a difference between the reference time of the uplink signal and a time of a start of a subframe containing the uplink signal.

2. The method of claim 1, wherein the reference time of the uplink signal corresponds to the start of the subframe containing the uplink signal.

3. The method of claim 2, wherein the reference time of the uplink signal is determined in accordance with at least one of the timing information, the numerology of the uplink signal, or an uplink signal configuration at the measuring device.

4. The method of claim 1, wherein the timing information comprises a radio frame initialization time indicating a time of a start of a radio frame number zero.

5. The method of claim 4, wherein the reference time of the uplink signal is determined in accordance with the radio frame initialization time.

6. The method of claim 5, wherein the reference time of the uplink signal is determined further in accordance with a system frame number of a frame containing the uplink signal.

7. The method of claim 6, wherein the reference time of the uplink signal is determined further in accordance with the subframe containing the uplink signal.

8. A method, comprising:
   determining, by an apparatus, timing information associated with an uplink signal and a numerology of the uplink signal, wherein the timing information is used to determine a reference time of the uplink signal sent by the apparatus; and
   transmitting, by the apparatus to a measuring device, the uplink signal in accordance with the timing information and the numerology of the uplink signal,
   wherein the uplink signal and the reference time of the uplink signal are used to measure an uplink relative time of arrival (UL RTOA), and
   wherein the UL RTOA is a difference between the reference time of the uplink signal and a time of a start of a subframe containing the uplink signal.

9. The method of claim 8, wherein the reference time of the uplink signal corresponds to the start of the subframe containing the uplink signal.

10. The method of claim 9, wherein the reference time of the uplink signal is determined in accordance with at least one of the timing information, the numerology of the uplink signal, or an uplink signal configuration at the measuring device.

11. The method of claim 8, wherein the timing information comprises a radio frame initialization time indicating a time of a start of radio frame number zero.

12. The method of claim 11, wherein the reference time of the uplink signal is determined in accordance with the radio frame initialization time.

13. The method of claim 12, wherein the reference time of the uplink signal is determined further in accordance with a system frame number of a frame containing the uplink signal.

14. The method of claim 13, wherein the reference time of the uplink signal is determined further in accordance with the subframe containing the uplink signal.

15. A measuring device, comprising:
at least one processor; and
a non-transitory computer readable storage medium storing programming for execution by the at least one processor, the programming including instructions to:
receive timing information associated with an uplink signal and a numerology of the uplink signal, wherein the timing information is used to determine a reference time of the uplink signal received from a user equipment (UE);
receive, from the UE, the uplink signal in accordance with the timing information and the numerology of the uplink signal; and
measure an uplink relative time of arrival (UL RTOA) in accordance with the uplink signal and the reference time of the uplink signal, wherein the UL RTOA is a difference between the reference time of the uplink signal and a time of a start of a subframe containing the uplink signal.

16. The measuring device of claim 15, wherein the reference time of the uplink signal corresponds to the start of the subframe containing the uplink signal.

17. The measuring device of claim 16, wherein the reference time of the uplink signal is determined in accordance with at least one of the timing information, the numerology of the uplink signal, or an uplink signal configuration at the measuring device.

18. The measuring device of claim 15, wherein the timing information comprises a radio frame initialization time indicating a time of a start of a radio frame number zero.

19. The measuring device of claim 18, wherein the reference time of the uplink signal is determined in accordance with the radio frame initialization time.

20. The measuring device of claim 19, wherein the reference time of the uplink signal is determined further in accordance with a system frame number of a frame containing the uplink signal.

21. The measuring device of claim 20, wherein the reference time of the uplink signal is determined further in accordance with the subframe containing the uplink signal.

22. An apparatus, comprising:
at least one processor; and
a non-transitory computer readable storage medium storing programming for execution by the at least one processor, the programming including instructions to:
determine timing information associated with an uplink signal and a numerology of the uplink signal, wherein the timing information is used to determine a reference time of the uplink signal sent by the apparatus; and
transmit, to a measuring device, the uplink signal in accordance with the timing information and the numerology of the uplink signal,
wherein the uplink signal and the reference time of the uplink signal are used to measure an uplink relative time of arrival (UL RTOA), and
wherein the UL RTOA is a difference between the reference time of the uplink signal and a time of a start of a subframe containing the uplink signal.

23. The apparatus of claim 22, wherein the reference time of the uplink signal corresponds to the start of the subframe containing the uplink signal.

24. The apparatus of claim 23, wherein the reference time of the uplink signal is determined in accordance with at least one of the timing information, the numerology of the uplink signal, or an uplink signal configuration at the measuring device.

25. The apparatus of claim 22, wherein the timing information comprises a radio frame initialization time indicating a time of a start of radio frame number zero.

26. The apparatus of claim 25, wherein the reference time of the uplink signal is determined in accordance with the radio frame initialization time.

27. The apparatus of claim 26, wherein the reference time of the uplink signal is determined further in accordance with a system frame number of a frame containing the uplink signal.

28. The apparatus of claim 27, wherein the reference time of the uplink signal is determined further in accordance with the subframe containing the uplink signal.

* * * * *